United States Patent
Romey

[15] 3,702,507
[45] Nov. 14, 1972

[54] VISUAL TEACHING DEVICE FOR TELLING TIME

[72] Inventor: Herbert R. Romey, 640 Capitol Street S.E., Salem, Oreg. 97301

[22] Filed: Nov. 30, 1970

[21] Appl. No.: 93,792

[52] U.S. Cl..................................................35/39
[51] Int. Cl............................................G09b 19/12
[58] Field of Search..........35/39, 31 A; 58/85.5, 106, 58/126 D

[56] References Cited

UNITED STATES PATENTS

| | | | |
|---|---|---|---|
| 2,994,970 | 8/1961 | Spooner | 35/39 |
| 2,172,450 | 9/1939 | Pitcher | 35/39 |
| 2,695,463 | 11/1954 | Spooner | 35/39 |
| 2,997,794 | 8/1961 | Burr | 35/39 |

FOREIGN PATENTS OR APPLICATIONS

| | | | |
|---|---|---|---|
| 926,995 | 4/1947 | France | 35/39 |
| 96,892 | 9/1939 | Sweden | 35/39 |

*Primary Examiner*—Wm. H. Grieb
*Attorney*—James D. Givnan

[57] ABSTRACT

A manipulatory device as a visual aid for teaching children to tell time. The device comprises a base plate whose top surface represents the face of a clock provided with an hour hand and a minute hand of unlike colors and individually rotatable about a common pivot. The hours are indicated by peripherally arranged standard numerals 1 to 12, of a color matching that of the hour hand. Concentrically arranged numerals, of a color matching that of the minute hand, designate minutes from 12 to 12:30 on the clock face and in reverse order from 12:30 to 12:00. A dividing line from the hour numeral 6 to the hour numeral 12 divides the clock face into a left hand segment marked UNTIL and a right hand segment marked AFTER.

1 Claim, 3 Drawing Figures

PATENTED NOV 14 1972          3,702,507

HERBERT R. ROMEY
*INVENTOR.*

BY James D. Girman
ATT'Y

VISUAL TEACHING DEVICE FOR TELLING TIME

This invention relates to educational devices and more particularly to a visual aid for teaching children to tell time.

The objects of the invention are:

To provide a visual time-teaching aid which takes advantage of the mental capacities of the average child, prior to formal training. In particular, the principal object of the present invention is the provision of an educational device of the character described which represents by clearly visible numerical and lettered indicia the fundamental process involved in telling time by a young child.

To provide minute and hour hands in relation to numerical indicia representing the hours and minutes of a period of time, whereby time-telling problems are automatically answered.

To provide a device of the character described which is of simple, efficient, durable, and inexpensive construction.

The foregoing and other objects and advantages which will become subsequently apparent reside in the details of construction and operation as more fully hereinafter described and claimed, reference being had to the accompanying drawing forming a part hereof and in which:

Figure 1:
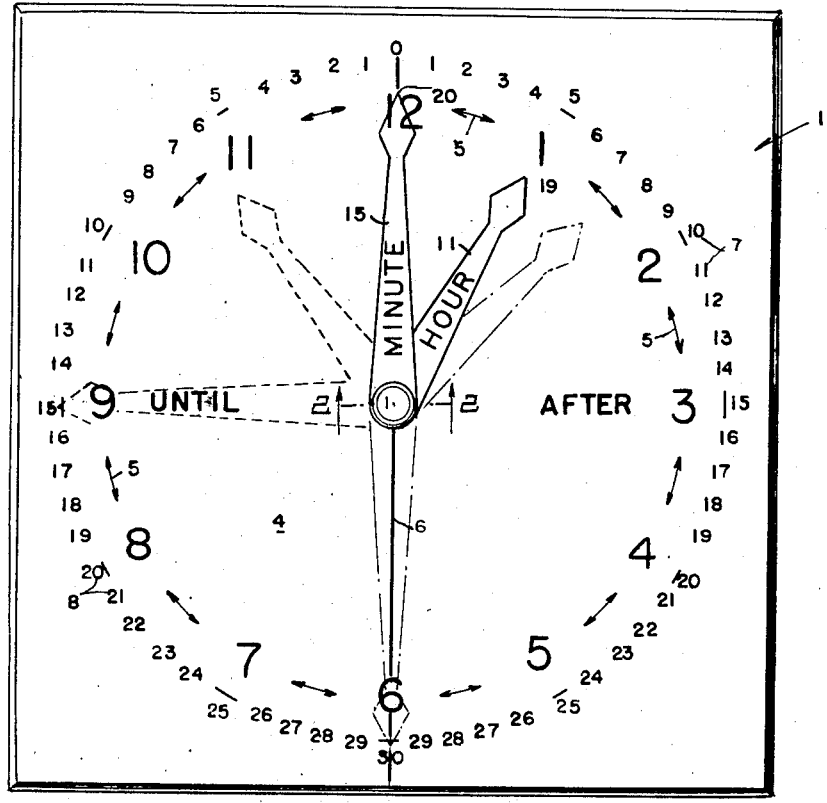
FIG. 1 is a plan view of a visual time-telling, manipulatory device made in accordance with my invention.

Referring now more particularly to the drawing wherein like reference characters designate like parts, numeral 1 indicates generally a base plate made of any suitable material of a desired thickness having a central opening 2 extending therethrough and enlarged by a downwardly opening counterbore 3.

The top surface 4 of the base, sometimes hereinafter referred to as the face of the clock or clockface, has inscribed, embossed, or printed thereon hour numerals of one color reading from 1 to 12 in a clockwise direction and arranged concentrically relative to the central opening 2. Double pointed arrows 5, colored the same as the hour numerals, are arranged circumferentially between the hour numerals for a purpose hereinafter described.

A line 6 extends from the hour numeral 6 to the hour numeral 12, dividing the clock face into left and right hand segments of unlike colors and marked respectively UNTIL and AFTER.

Minute numerals indicated generally at 7 are arranged concentric to the hour numerals and read in consecutive increments of one minute each from 12 to 6 and in reverse order, as indicated generally at 8, from 6 to 12.

Figure 2:
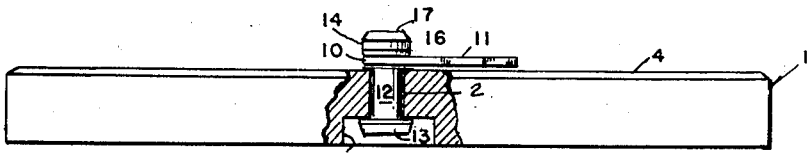
FIG. 2 is an elevational view of FIG. 1, partly in section as viewed approximately along the line 2—2 of FIG. 1.

As best illustrated in FIG. 2, the inner end 10 of an hour hand 11 is rotatably mounted upon a pin 12 extending through the opening 2 in the base 1 and headed as at 13 at its bottom end within the counterbore 3. The inner end 14 of a minute hand 15 is similarly mounted on the pin 12. Both hands 11 and 15 and a separating washer 16 are held in place by a headed top end 17 of the pin 12. The hour hand 11 and the minute hand 15 are of conspicuously unlike colors to easily distinguish one from the other. The color of the hour hand matches the color of the hour numerals 1 to 12 and the minute hand 15 is also of a color matching that of the minute numerals indicated generally at 7 and 8.

As previously stated the face of the clock is divided into left and right hand segments by a line 6 extending from the hour numerals 6 to the hour numeral 12. These segments marked respectively UNTIL and AFTER, are of unlike colors neither of which matches the color of the hour numerals or that of the minute numerals.

From the foregoing, it will be readily apparent that either hand is individually rotatable relative to the other and to the clock face.

The outer end of each hand is pointed as at 19 and 20 as shown in FIG. 1 for precisely aligning the hands with the hour numerals or the minute numerals.

Figure 3:
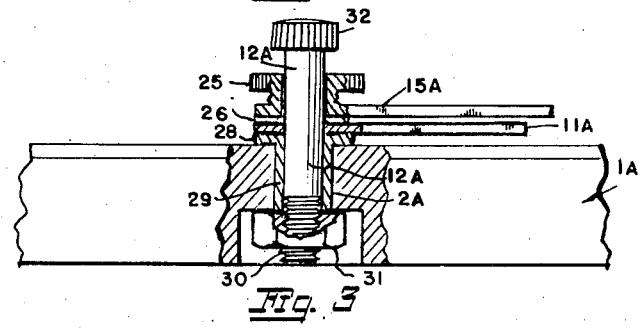
FIG. 3 is a fragmentary view, similar to FIG. 2, showing a modified form of pivot means for the hands of the clock.

In the modification shown in FIG. 3, the inner end of the minute hand 15A is formed integral with a knurled flange 25 and rests upon a spacer washer 26 which rests upon the inner end of the hour hand 11A. The combined minute hand, spacer, and hour hand are rotatably supported upon the flanged top end 28 of a hollow bushing 29 extending downwardly through the opening 2A in the base plate 1A. The pin 12A is threaded as at 30 for a portion of its length, as shown, and extends below the bottom end of the bushing 29 for threaded engagement with a locknut 31. Here, as in FIG. 2, the hour hand and minute hand are freely rotatably about the pin 12A. In addition thereto, because of the space between the knurled flange 25 and the headed top end 32 of pin 12A, the minute hand 15A may be lifted upwardly and rotated in either direction without disturbing the setting of the hour hand 11A.

The following teaching technic may be advantageously followed in utilizing the time-telling aid of the present invention:

First, the child is taught the relatively simple phrase "The time is", and then taught to identify the AFTER side or segment of the clock face with the hour numerals from 12 to 6 and also to associate the other or UNTIL side with the hour numerals from 6 to 12.

Once the above is reduced to memory, the child is taught that the hand 11 is the hour, or the "o'clock," hand and that the hand indicated at 15 is the minute hand and is so marked. The child is then informed that the hour numerals from 1 to 12 indicate the hours of the day, and that the hour numeral nearest to the hour hand is the hour of the day and that the position of the minute hand 15 in relation to the minute numerals between 1 and 29 on the AFTER side of the clock face are the minutes after that particular hour, and that the position of the minute hand in relation to the minute numerals from 30 to 1 on the opposite or UNTIL side of the clock face are the minutes remaining before the hour is reached by the hour hand.

When the child is capable of ascertaining the numerals from 1 to 29, which is entirely commonplace, he is taught to employ the minute hand with the appropriate numerals in ascertaining the exact time in minutes AFTER or UNTIL. The child then by observing the clockface with the hour and minute hands as appearing in solid lines in FIG. 1 that the time is exactly 1 o'clock and that the position of the hour and minute hands in broken lines will indicate that it is half past one or 1:30. By the same logic with the hour and minute hands in the dotted line positions, he can quickly ascertain that it is quarter to 11:00, or, in other words, 15 minutes until 11 o'clock.

From the foregoing arrangements of the hands, which are exemplary of other arrangements around the face of the clock, the exact hour of the day or the minutes BEFORE or AFTER any hour may be quickly ascertained.

The double pointed arrows 5 indicate the hour of the day away from which the hour hand has moved and the sequential hour toward which it is progressing.

What I claim is:

1. A visual aid for teaching children to tell time, comprising a base plate having a clock face thereon,
    said clock face defined by peripherally arranged hour numerals,
    peripherally arranged minute numerals concentric with said hour numerals,
    an hour hand and a minute hand centrally and movably mounted on said clock face,
    said hour numerals of one color and said minute numerals of another color,
    said hour hand of a color matching that of said hour numerals and said minute hand of a color matching that of said minute numerals,
    double pointed arrows applied to the clockface between said hour numerals to indicate the hour of the day away from which the hour hand has moved and the sequential hour to which the hour is progressing,
    means mounting said hour and minute hands to said base plate for independent movement relative to each other and to said hour and minute numerals,
    said base plate having central opening therethrough,
    a bushing extending through said central opening through said base and flanged at its top end to provide a spacer for said hour hand,
    a pivot pin extending through said central opening and said bushing and removably secured to said base plate,
    said hour and minute hands each having an opening therethrough and thereby pivotally attached to said pin,
    the inner end of said hour hand resting upon the flange of said bushing and rotatable about said pin,
    a spacer washer resting upon said inner end of said hour hand,
    the inner end of said minute hand formed integral with a knurled flange and resting upon said spacer washer,
    said pin extending above said knurled flange at the inner end of said minute hand and having a knurled top,
    said knurled top being spaced above said knurled flange a distance sufficient to enable said minute hand to be moved upwardly from said spacer washer, for free rotation about said pin without disturbing the setting of the hour hand,

* * * * *